Aug. 7, 1934.                G. SZIKLA ET AL                 1,969,282
                              HEAT ACCUMULATOR
                             Filed May 4, 1931            3 Sheets-Sheet 2
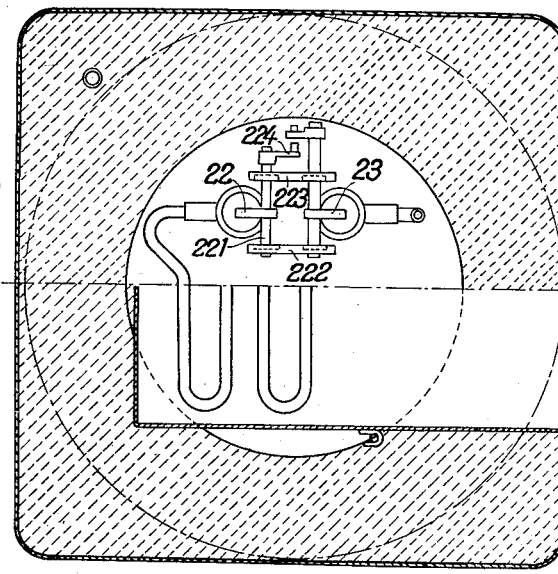
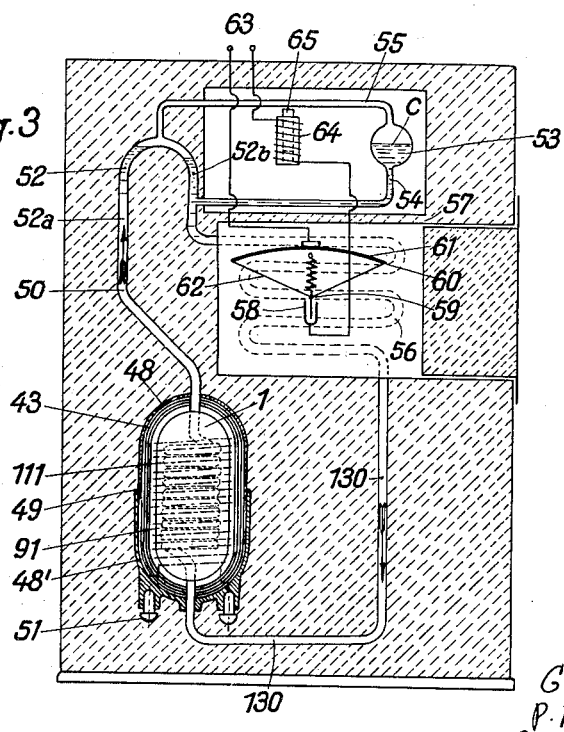

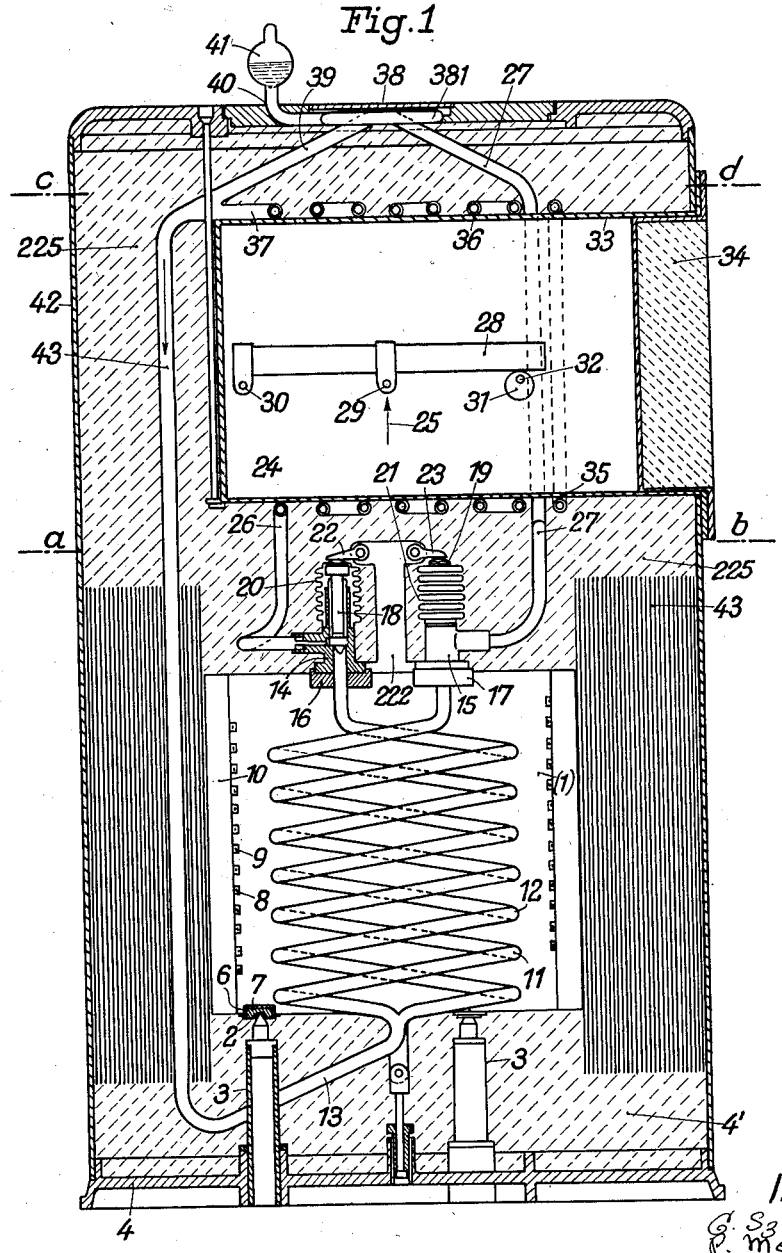

Patented Aug. 7, 1934

1,969,282

UNITED STATES PATENT OFFICE 1,969,282

HEAT ACCUMULATOR

Géza Szikla, Paul Merse, and Paul von Vágó, Budapest, Hungary

Application May 4, 1931, Serial No. 534,924
In Hungary May 15, 1930

16 Claims. (Cl. 219—38)

This invention relates to a method of and an apparatus for storing and utilizing heat. The invention has more particularly for its object to store at the time of lightest load the heat gained from electrical energy and to utilize the heat thus stored at any desired times and to regulate the temperature.

It is known that the load of electric power stations can be represented by a curve which varies according to definite periods of the day and which in general has two peak values which are represented at definite intervals of time.

As both the power station and its distributing network must be designed to cope with the daily peak load which lasts only for a few hours, it is of great importance to include in the distributing network consumers which cover their energy demand not at times of the peaks but at times of minimum load.

According to the invention the heat is stored in a liquid having a high boiling point and as low a heat conduction as possible in an accumulator which is well insulated against heat losses and the liquid heat carrier is conveyed in closed circulation and is regulable quantities to one or more heating devices which are disposed separate from the accumulator so as to be heat-insulated therefrom. The flow of liquid which carries the heat is completely shut off from the atmosphere and the accumulator and the heating device are separated from one another by heat-insulating layers.

According to the invention a liquid is used as the heat carrier, the boiling point of which lies considerably above the temperature limit which is the highest working temperature of the heat utilization. For this purpose mercury is particularly suitable, the boiling point of which at atmospheric pressure amounts to 357° C. and which even at 450° C. has only a moderate vapour tension. In place of mercury any other liquid can of course be used, the boiling point of which is considerably above that of water, for instance an easily liquefiable metal alloy which remains in the liquid state at the desired working temperature.

The advantage of the employment of mercury and in general of metals having a high boiling temperature for the purpose of heat convection by a flow of liquid consists in this, that this makes possible a regulable heat convection even at the highest temperatures without the formation of vapour, the maximum temperature being limited only by the strength of the steel tubes which serve the purpose of conveying the hot stream of metal. Experience has shown that steel tubes can be used with satisfactory safety even at a temperature of 500° C. for the moderate vapour pressures involved.

The apparatus according to the invention is therefore particularly suitable for use as an electrically heated baking and cooking apparatus for household purposes, which is kept in operation by a storage element heated up to 500° C. in such a manner by the circulation of the accumulator liquid that in the heating or baking space separated from the storage element, any desired temperature lying below the limit of 500° C. can be maintained for prolonged periods with a regulably constant character. The method and the apparatus can be employed for the most varied purposes in light and heavy industries.

A further advantage of the new plant consists in this, that the heat accumulator can be heated up to a considerably higher temperature than the maximum ordinary working temperature of the baking and cooking spaces. This enables a relatively great quantity of heat to be stored in a small accumulator, as the heat content of any body increases almost proportionately with its temperature.

The employment of mercury as the heat carrier for the heat convection provides special advantages. Owing to the high specific gravity and the great expansion of mercury the hydromotive force which will be developed with the same difference in temperature in a pipe line filled with mercury is approximately 13.6 greater than for instance in water. To this must be added that the convection of mercury in the liquid state can be effected within considerably wider temperature limits than that of water. Furthermore, the forces offering resistance to the flow of mercury are considerably smaller than in the case of water, owing to the low viscosity of mercury, so that the velocity of flow of the stream of mercury is considerably greater than that of water. The thermal conductivity of mercury ($\lambda=6.5$) is only 1/7 of the thermal conductivity of iron. While therefore a pipe with stagnant mercury transmits considerably smaller quantities of heat through conduction than an iron bar of the same cross-section, as soon as the mercury flows, the heat transfer will, owing to the greater velocity of flow and the greater conductivity which is ten times as great as that of water ($\lambda=0.48$), commence with great intensity.

Owing to these favourable conditions the operation of a storage oven with a storage capacity of 13,000 kg. calories, for instance for the kitchen of a fairly large household, requires no more than 3 kg. mercury. Any loss in this charge can be prevented by its being sealed hermetically.

Further details of the apparatus will be hereinafter described with reference to the accompanying drawings, in which Fig. 1 is a section through an electrically heated oven according to the invention, Fig. 2 in the upper half shows a section along line a—b of Fig. 1, and in the lower half a section through line c—d of Fig. 1.

Fig. 3 shows another constructional form of the apparatus, more particularly the regulating arrangement in section.

Figure 4:
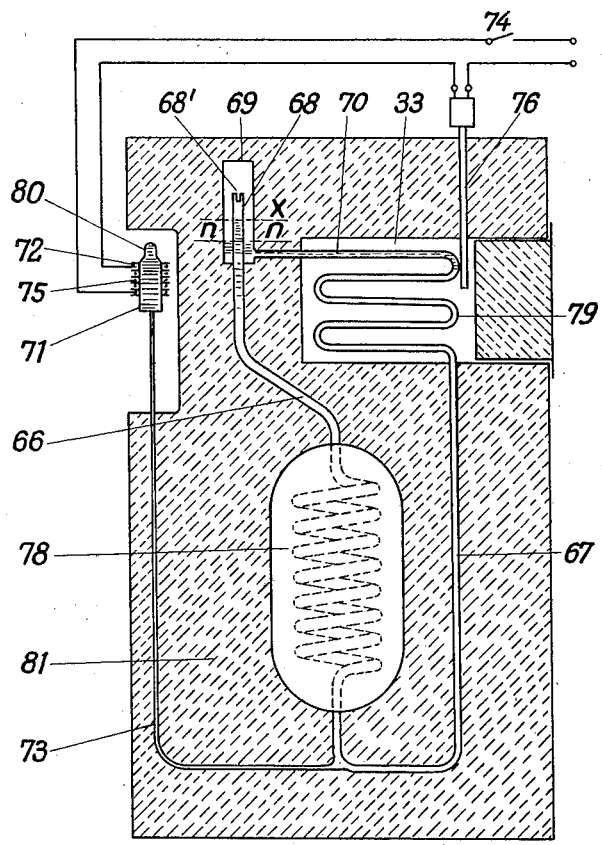
Fig. 4 shows a third constructional example of the regulator for the flow of liquid also in section.

In the arrangement shown in Fig. 1 of the drawings, 1 is a cylindrical body, preferably made of cast iron, which rests on the points 2 of three supports 3. The supports 3 lie in the corners of an equilateral triangle and are mounted in the bed-plate 4. They extend through a thick heat-insulating layer 4' and support the cylindrical body 1 with interposed discs 7 which are embedded in the insulating layer 6. The shell of the cylinder 1 has a thread 8 in which an insulated bifilar electrical heating spiral is disposed. The cylinder 1 is inserted in an outer hollow cylinder 10. The two cylinders form one part of the heat accumulator. In the interior of the cylinder 1 there are disposed, in the example shown, two pipe spirals 11 and 12 which are preferably cast in the cylinder 1. Several such spirals may also be used. The two spirals 11 and 12 are branched off from a common downcomer 13 and lead with their free upper ends each to a valve casing 14 and 15 respectively. They are sealed by sleeves 16 and 17 which are welded both to the tube ends and to the valve casings. The two valves are similar to one another. Each consists substantially of a valve body proper with the spindle 18 which is connected at its upper end with an elastic corrugated tube 20 and 21 respectively by being welded thereto. The elastic corrugated tube seeks to lift the valve which is, however, pressed down into the closed position by the lever 22. The lever 22 is mounted on the shaft 221, which is journalled so as to turn in the supports 222 and 223 and bears at one end the crank 224. To this crank is attached a rope 24 which is connected at a suitable point 27 to a bimetallic bar 28. Similarly the spindle of the second valve is loaded by the lever 23.

The valve 18 controls the connection between the accumulator spiral 12 and the heating coil 36, which is laid around the baking space 33 and is connected to the valve casing 14 through the pipe 26. The baking space is closed by the door 34 and separated from the heat accumulator 1, 11, 12 by a thick heat insulating layer 225. The valve arrangement and the baking space and the pipes for the heating fluid are all embedded in this heat insulating mass. The tube coil 36 is preferably welded to the walls of the baking space 33, which is made of sheet iron. The riser 27 leads from the other valve casing 15 to a heating coil 381 disposed behind the heating plate 38. The coil 381 may be welded to the plate 38. Both the heating coil 36 of the baking space 33 and the heating coil 381 of the heating plate 38 are connected through the connecting pipes 37 and 39 to the common downcomer 43 in which the fluid flows in the direction of the arrow, by way of the pipe 13, to the heat accumulator 1, 11, 12. In the baking space 33 the bimetallic bar 28 already referred to is disposed. It is rotatable about the pivot 30 and rests at the other free end on the periphery of an eccentric 32. The eccentric can be turned by hand from the outside.

To the heating coil 381 is connected through the connecting pipe 40 a vessel 41 which is shut off from the outer air and is preferably spherical. The vessel 41 is only partly filled by the heat transmitting fluid. The remaining space is preferably filled with an inert gas under pressure, the pressure of which is greater than the boiling pressure of the heat transmitting fluid, so that the latter is prevented from boiling up.

All of the above described constituent parts of the apparatus are built together to form a unit and are enclosed in a common shell 42. The space between the baking space 33 of the shell 42 is filled with the heat insulating mass 225 already referred to. The heat accumulator 1, 11, 12 is preferably protected against heat losses by superposed layers disposed inside the shell of a material, for instance Alfol, which prevents radiation from the accumulator.

The apparatus operates in the following manner:

The heating spirals 9 of the heat accumulator are kept supplied with current by a clockwork mechanism not shown in the drawings, when the power station is under the lightest load and until the temperature of the heat accumulator 1, 11, 12 has reached the admissible maximum limit. After reaching this maximum temperature the current is cut off by a temperature relay not shown in the drawings. At the same time the valves 14, 18 and 15, 19 are closed, so that there will be no appreciable heat transmission either through convection in the pipe system 13, 12, 26, 35, 38 or owing to the careful heat insulation between the heat accumulator and the heat dispersing members 33 and 38 through radiation and conduction.

On the bimetallic bar 28 being lowered in the opposite direction to the arrow 25 by turning the shaft 32, the valve 18 will be opened, partly owing to the elastic tension of the corrugated tube 20 and partly owing to the pressure of the fluid heat carrier, so that a flow commences in the pipe 43 in the direction of the arrow between the spiral 12 and the coils 26, 35, 36 and between the downcomer 43, 13 and consequently an intensive transmission of heat between the heat accumulator and the baking space takes place. Should the temperature of the baking space exceed an admissible limit the bimetallic bar 28 will bend in the direction of the arrow 25 and close the valve 18 to an extent corresponding to the bending of the bar.

Fig. 3 shows another constructional form with only a single fluid circuit. In order to reduce the heat losses of the heat accumulator to a minimum the heat accumulator 1 is enclosed in an evacuated and hermetically sealed envelope 48. This envelope may suitably be made in two halves, the lower half 48' being welded to the upper half along the seam 49. Both halves may be provided inside or outside with a number of heat reflecting layers 43. The accumulator body 1 in the interior of which is the spiral pipe 111 for the heating fluid is provided at its shell with the heating spiral 91, the supply leads of which are in the form of electrodes 51 fused in in glass in the shell 48'. The accumulator body 1 is nowhere in contact with the shell and is held in position by the connecting pipes 50 and 130.

The riser 50 forms a downwardly open U-shaped bend 52 consisting of the limbs 52a and 52b. From the limb 52b there is branched off an elastic tube 54 which opens into the bottom of a spherical vessel 53. The upper part of the vessel 53 is connected by way of a tube 55, which is also elastic, to the highest point of the bend 52. In the position shown the centre of the spherical vessel 53 is approximately at the same height as the apex of the centre line in the bend 52. The limb 52b is connected to the heating coil 56 of the baking oven 57, the lower end of which coil is connected to the downcomer 130. In the baking space an electric contact-making device is provided, which consists for instance of the mercury vessel 58 and the dipping contact 59. The spring 60 seeks to close the contact. The bimetallic bar 61 which is also disposed in the baking space is connected at its two ends by springs 62 to the dipping contact, the bar 61 being so arranged that it or the spring 60 closes the contact 58 on being deformed on the temperature increasing above an admissible maximum. The contact-making mechanism just described controls the current circuit of a solenoid 64, the core 65 of which is connected to the tube 55.

The apparatus operates as follows:

Through the heating up of the accumulator body 1 a difference in temperature is created in the riser 50 and the downcomer 130 of the circulatory system, and consequently a hydro-motive force in the auxiliary fluid of the circulatory system. The amount of this hydro-motive force is shown by a correspondingly great difference in the fluid levels between the rising branch 52a and the falling branch 52b of the U-shaped tube. On the vessel 53 being lowered, the levels in the two branches 52a and 52b will also drop. By a suitable lowering of the two levels the flow of fluid between the riser 50 and the downcomer 130 will be entirely interrupted, whereas by a suitable raising of the vessel 53 the fluid level in the branch 52a and 52b will rise and the connection between 50 and 130 be re-established.

The described electric arrangement effects an automatic regulation, current flowing through the solenoids 64 on an admissible maximum temperature being exceeded, whereby the lowering of the vessel 53 interrupts the flow of fluid in the manner described. This electrical regulating arrangement can be ommitted and the regulation effected by hand.

Another solution of the valve-less regulation is shown in Fig. 4. The heat accumulator 78 can be in the same form as the accumulator shown in Fig. 3. The hot liquid passes first into the pipe 66, which terminates in an open overflow pipe 68. The end of the pipe 68 is provided with vertical slots 68' and forms the most elevated point in the circulatory system, at which the rising flow of fluid must be caused to overflow for initiating and maintaining the circulation. The pipe section 68 is disposed in the casing 69, to the lower part of which is connected the heating means 79 of the baking space 33 through the pipe 70. The circulatory system to the accumulator is completed by the downcomer 67. The circulatory system 66—79—67 has a branch 73 which is connected to the lowest part of a higher-lying hermetically sealed vessel 71. This vessel is exposed to the outside air and is thus cooled by it, while all the other parts of the apparatus are embedded in the heat insulating mass 81. The vessel 71 is provided with an electric heating spiral 75 and with cooling ribs 72. The heating spiral 75 is connected up in series with the temperature relay 76, which is disposed in the baking space. The whole of the circulatory system is filled with mercury or the like up to the level $n$—$n$ so that the riser 68 extends above the mercury level in the vessel 69. The vessel 71 and the pipe 73 leading to it is filled with mercury up to the top hollow extension 80 of the vessel 71. In the cap-shaped hollow extension 80 is a drop of water which rests on the surface of the mercury and the amount of which is such that even when it is completely evaporated there can be no inadmissibly high pressure within the mercury pipe. The pipe 73 is connected to the pipe 67 at as low a point as possible.

On the heat accumulator 78 being heated up the mercury in the overflow pipe 68 at first only rises up to the level $x$, without overflowing at the orifice of the pipe 68, and initiating the transmission of heat.

On the auxiliary circuit of the heating spiral 75 being, however, closed by the switch 74, owing to the heating of the vessel 71 above 100° C., the steam pressure of the boiling drop 80 will be increased until the steam pressure forces the mercury charge of the vessel 71 through the pipe 73 into the circulatory system 66, 67.

This causes the mercury level in the spaces 69 and 68 to rise at the same time. As soon as the mercury level in the overflow pipe 68 reaches the slots 68', a flow of mercury which increases as the level of mercury rises in the pipe 68 commences in the circulatory system. The effect of the slots 68' in the riser is that the flow commences and terminates gradually instead of suddenly.

When the desired temperature in the baking space 33 is reached, the auxiliary current of the heating spiral 75 is interrupted by the relay 76, causing a liquefaction of the steam in the vessel 71, assisted by the heat dispersion of the cooling ribs and consequent lowering of the mercury level in the vessel 69 and finally a complete interruption of the mercury flow in the circulatory system.

Figure 5:
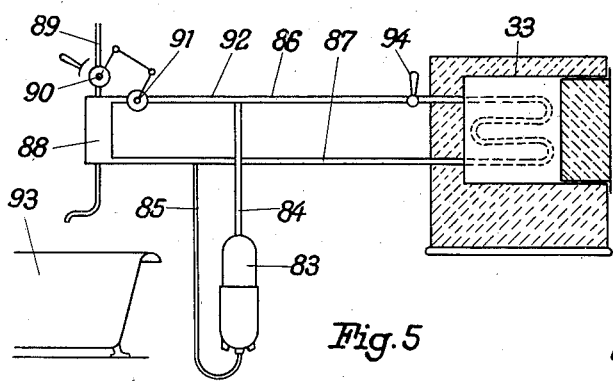
Fig. 5 shows an arrangement in which the heat consumer is separate from the accumulator.

In Fig. 5 an arrangement is shown in which the heat accumulator 48 is completely separate from the elements which give off heat. The riser 84 connected to the heat accumulator 83 and the downcomer 85 are each connected to a collecting pipe 86, 87 respectively, to which the various consumers are connected parallel to one another in a known manner. 33 is a baking oven and 88 a heating body for the water supply 89.

The cock 90 of the water supply can be connected parallel to the throttle cock 91 of the mercury pipe 92. By opening the cock 90 water will then flow into the bath 93, which water is heated by the simultaneous opening of the mercury cock 91, by the flow of heat of the mercury. By opening the cock 94 heat is supplied to the baking oven 33.

What we claim is:

1. In an electrically heated cooking and baking apparatus, a block which is insulated against heat losses and acts as the heat accumulator, an electric heating device disposed in the interior of the block, passages in the block for the reception of a fluid medium and a circulatory system connected to these passages, which returns the fluid medium to the heat consumers and from the latter to the passages in the accumulator, a valve for throttling the flow of fluid in the circulatory system, which valve is enclosed in an elastically yielding casing, and means which are capable of controlling the valve in the casing in dependence on the temperature of the consumer by way of the elastic casing.

2. In an electrically heated cooking and baking apparatus, an electrically heated heat accumulator, one or more heat consumers, means for the heat-insulated separation of the heat accumulator from the heat consumer, a fluid which, flowing through the accumulator and the consumer in a circulatory system, is capable of transmitting the heat, throttling members in the circulatory system for regulating the flow of the fluid, means disposed in the consumer which change their form with variations in the temperature for controlling the throttling members, and means for displacing the said members for the purpose of starting and stopping the flow of fluid.

3. In an electrically heated cooking and baking apparatus, an electrically heated heat accumulator, one or more heat consumers, means for conveying a fluid heat carrier from the accumulator to the consumer and for conveying the cooled heat carrier from the consumer back to the accumulator, a space closed to the outside which is in communication with the circulatory system of the heat-carrying fluid and is partly filled with a gas.

4. In an electrically heated cooking and heating apparatus, an electrically heated heat accumulator, one or more heat consumers, a fluid which conveys the heat from the heat accumulator to the heat consumer, pipe lines for conveying the hot fluid from the heat accumulator to the heat consumer and for conveying the cooled fluid from the heat consumer to the heat accumulator, an overflow pipe in the pipe for the hot fluid between the heat accumulator and the heat consumer, which overflow pipe opens in a closed space, out of which the fluid flowing down from the overflow pipe is conveyed away through an opening which lies lower than the opening of the overflow pipe, and means for lowering the fluid level in the overflow pipe for the purpose of interrupting the flow of fluid between the heat accumulator and the heat consumer.

5. In an electrically heated cooking and heating apparatus, an electrically heated heat accumulator, one or more heat consumers, a fluid which conveys the heat from the heat accumulator to the heat consumer, a pipe for conveying the hot fluid from the heat accumulator to the heat consumer, an elevated place of reversal in the said fluid pipe, to the apex of which the fluid from the heat consumer rises and from which it falls on the other side under gravity to the heat consumer and means for lowering the fluid level in the branch of the pipe rising to the place of reversal, for the purpose of interrupting the flow of the fluid.

6. In an electrically heated cooking and heating apparatus, an electrically heated heat accumulator, one or more heat consumers, a pipe between the heat accumulator and the insulated heat consumer for conveying a fluid for transmitting the heat from the accumulator to the consumer, an elevated place of reversal in the said pipe, at which the stream of fluid is divided into two fluid columns which are in communication with one another over a closed pipe, which closed pipe passes through the heat consumer and the heat accumulator, and means for lowering or raising the fluid stream in one or both fluid columns for interrupting or closing the fluid stream.

7. In an electrically heated cooking and heating apparatus, an electrically heated heat accumulator, a heat consumer, a circulatory system for conveying a heat transmitting fluid from the heat accumulator to the heat consumer and from the heat consumer to the accumulator, an elevated place of reversal in the pipe between the heat accumulator and the heat consumer, at which the stream of fluid is divided into two fluid columns which are in communication with one another through the return pipe of the cooled fluid from the consumer to the accumulator and means for conveying away the fluid out of the circulatory system.

8. In an electrically heated cooking and heating apparatus, an electrically heated heat accumulator, a heat consumer, a circulatory system for conveying a heat transmitting fluid from the heat accumulator to the heat consumer and from the heat consumer to the accumulator, an elevated place of reversal in the pipe between the heat accumulator and the heat consumer, at which the stream of fluid is divided into two fluid columns which are in communication with one another through the return pipe of the cooled fluid from the consumer to the accumulator, a collecting vessel for the fluid externally of the circulatory system, pipe lines between the said collecting vessel and the circulatory system, of which one connects the collecting vessel with the place of reversal in the pipe between the heat accumulator and the consumer and the other the collecting vessel with the downcomer between the place of reversal and the consumer, and means for raising and lowering the collecting vessel for the purpose of interrupting or closing the fluid stream.

9. In an electrically heated cooking and heating apparatus, an electrically heated heat accumulator, a heat consumer, a circulatory system for conveying a heat-transmitting fluid from the heat accumulator to the heat consumer and from the heat consumer to the accumulator, an elevated place of reversal in the pipe between the heat accumulator and the heat consumer, at which the stream of fluid is divided into two fluid columns which are in communication with one another through the return pipe of the cooled fluid from the consumer to the accumulator, a collecting vessel for the fluid externally of the circulatory system, pipe lines between the said collecting vessel and the circulatory system, of which one connects the collecting vessel with the place of reversal in the pipe between the heat accumulator and the consumer and the other the collecting vessel with the downcomer between the place of reversal and the consumer, both the said pipes being elastically yielding and means for raising or lowering the collecting vessel in dependence on the temperature of the heat consumer.

10. In an electrically heated cooking and heating apparatus, an electrically heated heat accumulator, a heat consumer, a circulatory system for conveying a heat-transmitting fluid from the heat accumulator to the heat consumer and from the heat consumer to the accumulator, an elevated place of reversal in the pipe between the heat accumulator and the heat consumer, at which the stream of fluid is divided into two fluid columns which are in communication with one another through the return pipe of the cooled fluid from the consumer to the accumulator, a collecting vessel for the fluid externally of the circulatory system, pipe lines between the said collecting vessel and the circulatory system, of which one connects the collecting vessel with the place of reversal in the pipe between the heat accumulator and the consumer and the other the collecting vessel with the downcomer between the place of reversal and the consumer, an electric controlling device for lowering and raising the collecting vessel in dependence on the temperature in the heat consumer, consisting of a temperature contact in the heat consumer, a circuit controlled by the temperature contact and an electromagnet fed by the said circuit for lowering the collecting vessel.

11. In an electrically heated cooking and heating apparatus an electrically heated heat accumulator, a heat consumer, a circulatory system for conveying a heat-transmitting fluid from the heat accumulator to the heat consumer and from the heat consumer to the accumulator, an elevated place of reversal in the pipe between the heat accumulator and the heat consumer, at which the stream of fluid is divided into two fluid columns which are in communication with one another through the return pipe of the cooled fluid from the consumer to the accumulator, a closed vessel filled with gas or vapour or a liquid which evaporates more readily than the heat-carrying fluid, a pipe connection between the gas or vapour vessel and the circulatory system of the heat-carrying fluid, and means for heating up the liquid to be evaporated in the vessel, for the purpose of imparting a flow to the heat-carrying fluid by the vapour or gas pressure.

12. In an electrically heated cooking and heating apparatus, an electrically heated heat accumulator, a heat consumer, a circulatory system for conveying a heat-transmitting fluid from the heat accumulator to the heat consumer and from the heat consumer to the accumulator, an elevated place of reversal in the pipe between the heat accumulator and the heat consumer, at which the stream of fluid is divided into two fluid columns which are in communication with one another through the return pipe of the cooled fluid from the consumer to the accumulator, a vessel filled with gas, vapour or a readily evaporating liquid, which vessel is in communication with the circulatory system of the heat-carrying fluid by way of a pipe which is filled with the same fluid as the circulatory system and opens into the gas space of the vessel, means for heating up the gas or for evaporating the liquid in the vessel, until the vapour pressure or the gas pressure raises the heat-carrying liquid over the place of reversal in the circulatory system and means for cooling the gas or for condensing the vapours for lowering the fluid level in front of the place of reversal.

13. In an electrically heated cooking and heating apparatus an electrically heated heat accumulator, a heat consumer, a circulatory system for conveying a heat-transmitting fluid from the heat accumulator to the heat consumer and from the heat consumer to the accumulator, an elevated place of reversal in the pipe between the heat accumulator and the heat consumer, at which the stream of fluid is divided into two fluid columns which are in communication with one another through the return pipe of the cooled fluid from the consumer to the accumulator, a vessel which is in communication with the circulatory system for the reception of a gas or vapour or a readily evaporating liquid for producing the pressure for heating up the heat-carrying fluid in the circulatory system, an electric heating device for heating the pressure vessel and means for connecting and disconnecting the heating circuit for the pressure vessel in dependence on the temperature in the heat consumer.

14. In an electric cooking and heating apparatus, an electrically heated heat accumulator, a closed vessel for the reception of the heat accumulator, which vessel is larger than the heat accumulator and the interior of which is evacuated, means for insulating the heat accumulator against heat loses, a heat consumer, a mercury-filled circulatory system between the heat accumulator and the heat consumer or conveying the heat from the heat accumulator to the heat consumer, means for regulating the flow of the hot mercury between the heat accumulator and the heat consumer and a pipe for returning the mercury cooled in the heat consumer from the heat consumer to the heat accumulator.

15. In an electric cooking and heating apparatus, an electrically heated heat accumulator and one or more heat consumers well insulated from the heat accumulator against the transmission of heat, a mercury-filled circulatory system, which conveys the hot mercury from the heat accumulator to the heat consumer and the cooled mercury from the heat consumer or consumers to the heat accumulator, means for automatically regulating the mercury stream in dependence on the temperature in the heat consumer, all these elements combined in a single unit and insulated against heat losses to the surroundings, substantially as described and as illustrated in the accompanying drawings.

16. In an electrically heated cooking and baking apparatus, a circulatory system comprising one or more heat consumers, an electrically heated heat accumulator arranged below said heat consumers, an upflow pipe in said heat accumulator, pipes connected to the upper end of said upflow pipe and to said heat consumers a downflow pipe connected to the said heat consumers and to the lower end of the upflow pipe, said circulatory system having therein a circulating liquid with a high boiling point for transferring the heat from the heat accumulator to the heat consumers and being enclosed in itself and fluid-tight with respect to its surroundings, so that no vapour formation can take place in the pipes, and regulating means arranged in the pipes connected to the upper end of the upflow pipe and to the heat consumers for controlling the movement of the liquid in the circulatory system by the hydromotive force produced by the difference in temperature between the liquid passing to the heat consumers and the liquid returned to the heat accumulator from the heat consumers, for the purpose of controlling the quantity of heat supplied to the heat consumers.

GÉZA SZIKLA.
PAUL MERSE.
PAUL von VÁGÓ.